US006182992B1

(12) United States Patent
Garven, Jr.

(10) Patent No.: US 6,182,992 B1
(45) Date of Patent: Feb. 6, 2001

(54) QUICK CHANGE CAMBER TUBE ASSEMBLY AND WHEELCHAIR WITH QUICK CHANGE CAMBER TUBE ASSEMBLY

(75) Inventor: Douglas M. Garven, Jr., Boulder, CO (US)

(73) Assignee: Sunrise Medical HHG Inc., Longmont, CO (US)

( * ) Notice: Under 35 U.S.C. 154(b), the term of this patent shall be extended for 0 days.

(21) Appl. No.: 09/332,480

(22) Filed: Jun. 14, 1999

(51) Int. Cl.[7] .......................... B62M 1/14

(52) U.S. Cl. .......................... 280/250.1; 280/86.751; 403/84

(58) Field of Search .......................... 280/250.1, 304.1, 280/86.751, 86.754, 86.75; 297/DIG. 4; 403/84, 87

(56) References Cited

U.S. PATENT DOCUMENTS

| | | | | |
|---|---|---|---|---|
| 4,420,272 | * | 12/1983 | Ingalls et al. | 280/86.756 |
| 4,650,201 | | 3/1987 | Hartwell | 280/242 WC |
| 4,970,801 | * | 11/1990 | Specktor et al. | 280/86.755 |
| 5,060,962 | * | 10/1991 | McWethy | 280/250.1 |
| 5,104,141 | * | 4/1992 | Grove et al. | 280/86.753 |
| 5,131,672 | | 7/1992 | Robertson et al. | 280/250.1 |
| 5,294,142 | * | 3/1994 | Weege | 280/250.1 |
| 5,320,373 | | 6/1994 | Robertson et al. | 280/250.1 |
| 5,333,894 | * | 8/1994 | Mayes | 280/250.1 |
| 5,480,172 | * | 1/1996 | James | 280/250.1 |
| 5,662,345 | * | 9/1997 | Kiewit | 280/250.1 |
| 5,851,018 | | 12/1998 | Curran et al. | 280/250.1 |

* cited by examiner

*Primary Examiner*—Daniel G. DePumpo
(74) *Attorney, Agent, or Firm*—MacMillan, Sobanski & Todd, LLC

(57) ABSTRACT

A wheelchair camber tube assembly for supporting rear drive wheels comprises a tube, an inner camber sleeve, an axle sleeve and a locking mechanism. The inner camber sleeve is slidably engageable within the tube. The inner camber sleeve has a central axis and a cylindrical bore. The said cylindrical bore has a central axis disposed at an angle relative to the central axis of the inner camber sleeve. The axle sleeve is rotatably engageable within the cylindrical bore in the inner camber sleeve. The axle sleeve has a central axis and an axle bore therein. The axle bore has a central axis disposed at an angle relative to the axle sleeve central axis. The locking mechanism is operatively engageable with the axle sleeve.

19 Claims, 9 Drawing Sheets

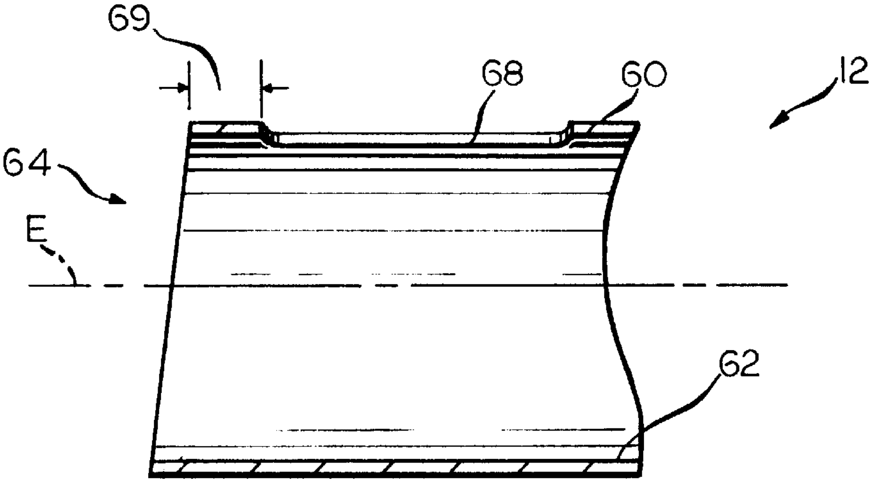
FIG. 5
FIG. 6
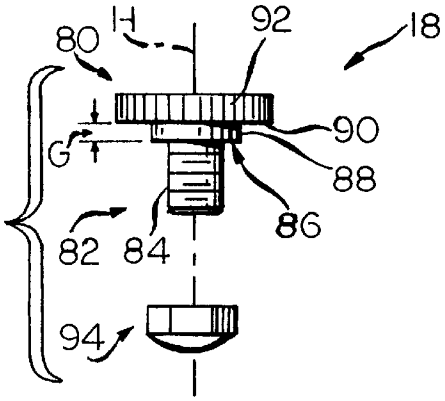
FIG. 7
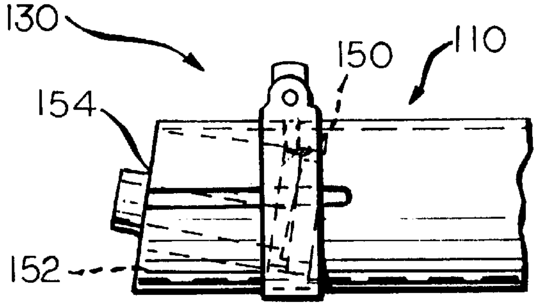

QUICK CHANGE CAMBER TUBE ASSEMBLY AND WHEELCHAIR WITH QUICK CHANGE CAMBER TUBE ASSEMBLY

BACKGROUND OF THE INVENTION

This invention relates in general to wheelchairs. More particularly, this invention relates to a selectively displaceable camber assembly for preselecting camber angles for wheelchair drive wheels.

Wheelchairs are well known forms of transportation that increase the mobility of the physically impaired. Wheelchairs are typically relatively small, single-person conveyances that generally comprise a seat supported by a frame which, in turn, is supported by two oppositely disposed drive wheels and front casters. The drive wheels are usually located behind the center of gravity of the wheelchair occupant and the front casters are swivel-mounted to the wheelchair frame to permit the occupant to maneuver the wheelchair with greater ease. The wheelchair is maneuvered by differentially driving the drive wheels. The drive wheels may be manually driven or power driven. The drive wheels may be cambered so that the distance between the drive wheels at ground level is greater than the distance between the drive wheels at the level of the wheelchair seat. The camber angle increases the stability of the wheelchair, and the inward tilt of the drive wheels at the level of the wheelchair seat enables the occupant of the wheelchair to propel the wheelchair with greater comfort because the occupant's arms fall closer to the occupant's body.

In order to meet the needs of the physically impaired, wheelchairs must be versatile. Wheelchairs must be easily and readily adapted to accommodate the particular size and shape of the occupant. Wheelchairs must also be versatile in adapting to both ambulatory and recreational travel. Moreover, wheelchairs must be sufficiently durable to provide comfortable transportation over obstacles or irregular surfaces.

A need exists for a camber angle adjustment assembly for adjusting the camber angle of wheelchair drive wheels in accordance with the various purposes for which the wheelchair is used. Cambered drive wheels provide stability for wheelchairs as the wheelchairs are turned about comers and help to prevent the wheelchair from tipping over. The camber angle for normal usage is generally in the range of about 0 to 3 degrees, while the camber angle for recreational activities is generally in the range of about 6 to 15 degrees, and possibly more at times.

The disadvantage of wheelchairs having cambered drive wheels is that wheelchairs having cambered drive wheels may have difficulty negotiating narrow passageways. One solution to this problem is to have different wheelchairs; for example, one wheelchair without cambered drive wheels and one with cambered drive wheels. This solution, however, would prove to be too costly for the average wheelchair occupant. An alternative solution would be to provide a wheelchair in which the camber angle of the drive wheels may be changed to meet the various needs of the wheelchair occupant. Changing the camber angle, however, is often time consuming in that it may require numerous difficult mechanical trial and error adjustments to avoid undesirable misalignment of the castors relative to the drive wheels and the ground.

SUMMARY OF THE INVENTION

This invention relates to a camber tube assembly. The camber tube assembly comprises a tube, an inner camber sleeve, an axle sleeve and a locking mechanism. The inner camber sleeve is slidably engageable within the tube. The inner camber sleeve has a central axis and a cylindrical bore. The said cylindrical bore has a central axis disposed at an angle relative to the central axis of the inner camber sleeve. The axle sleeve is rotatably engageable within the cylindrical bore in the inner camber sleeve. The axle sleeve has a central axis and an axle bore therein. The axle bore has a central axis disposed at an angle relative to the axle sleeve central axis. The locking mechanism is operatively engageable with the axle sleeve.

Various objects and advantages of this invention will become apparent to those skilled in the art from the following detailed description of the preferred embodiment, when read in light of the accompanying drawings.

BRIEF DESCRIPTION OF THE DRAWINGS

FIG. 5 is an enlarged side elevational view of a cross-tube of the invention shown in FIG. 2 with an inner cylindrical surface thereof shown in hidden lines.

FIG. 6 is an enlarged side elevational view of a locking mechanism of the invention shown in FIG. 2.

FIG. 7 is a side elevational view of an alternative adjustable camber tube assembly with an inner cylindrical surface of the alternative cross-tube, an inner cylindrical axle bore of the axle sleeve, and a radially displaceable axle sleeve engaging pin of the alternative locking mechanism all shown in hidden lines.

DETAILED DESCRIPTION OF THE PREFERRED EMBODIMENT

Figure 1:
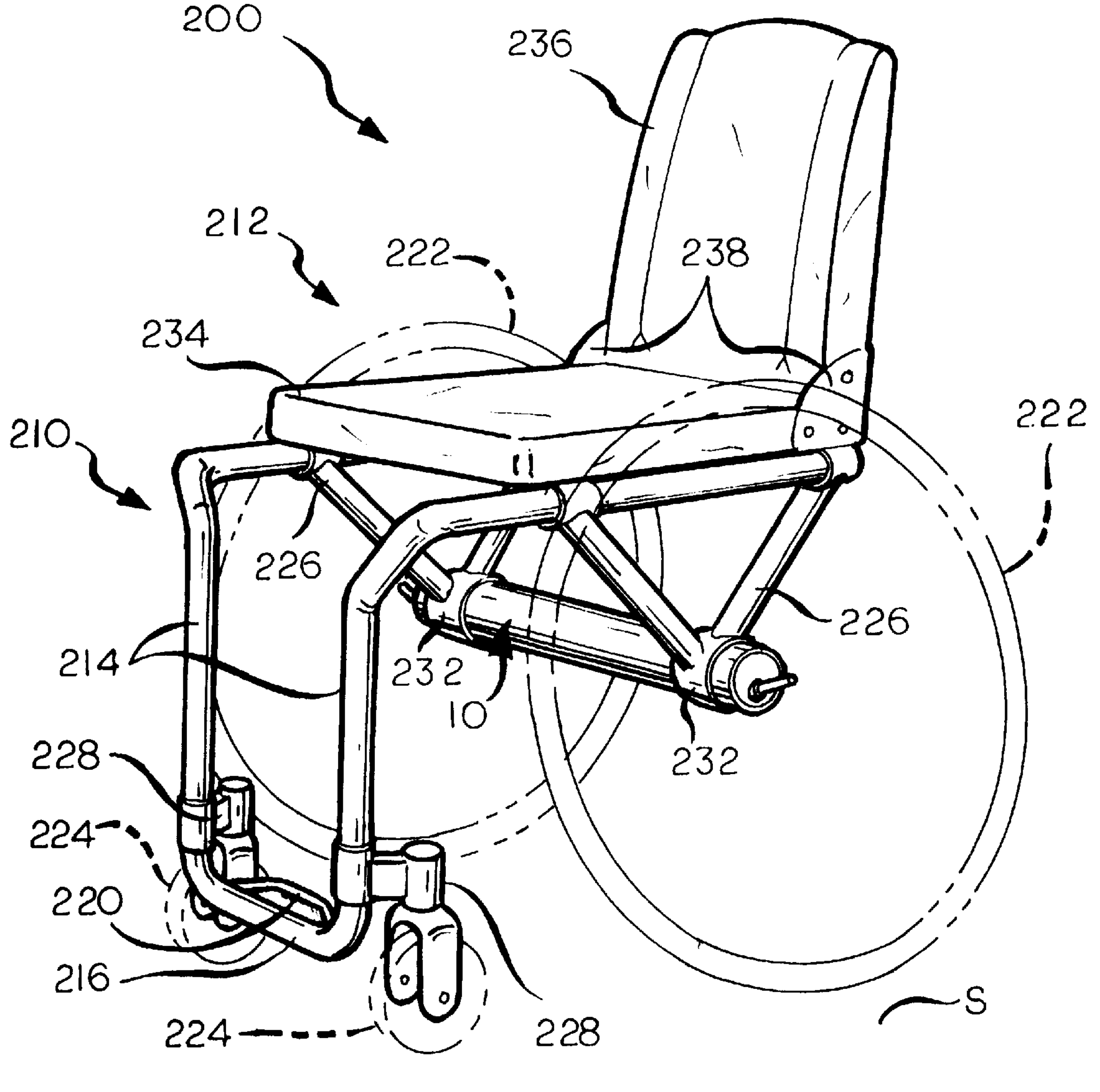
FIG. 1 is a front perspective view of a manually powered wheelchair upon which an adjustable camber tube assembly according to the invention may be used.

Referring now to the drawings, there is illustrated in FIG. 1 a wheelchair 200 for transporting a physically impaired occupant (not shown). The wheelchair 200 comprises a wheelchair frame or base frame 210 and a seat assembly 212. The base frame 210 includes opposite sides, generally indicated as two L-shaped side members 214. A front cross member 216 spans the front of the two L-shaped side members 214 and joins the front of the two L-shaped side members 214. Similarly, a rear cross member (not shown) spans the rear of the two L-shaped side members 214 and joins the rear of the two L-shaped side members 214. The base frame 210 further includes a footrest 220 extending from the front cross member 216 for supporting the feet of an occupant.

The seat assembly 212 includes a seat 234 and backrest 236. The seat 234 may be in the form of a padded cushion and may be removable if desired by the occupant. The backrest 236 may similarly be padded. The backrest 236 may be pivotally joined to the seat 234 or seat assembly 212, or to the base frame 210 by a pivotal connection, such as the pivotal connection 238 shown. It should be clearly understood that the seat assembly 212 is provided for supporting the occupant of the wheelchair 200.

Drive wheels 222 and casters 224 support the wheelchair 200 on a supporting surface S. The wheelchair 200 shown is manually driven. That is to say, the drive wheels 222 shown are manually driven. The drive wheels 222 are driven differentially by the occupant of the wheelchair 200 to maneuver the wheelchair 200 as desired. The casters 224 swivel so as to minimize resistance to the maneuverability to the wheelchair 200. The drive wheels 222 are supported by an adjustable camber tube assembly 10 which, in turn, is coupled to the base frame 210 of the wheelchair 200 by drive wheel support brackets 226. It should be understood that the drive wheels 222 may alternatively be coupled to the seat assembly 212. The casters 224 are coupled to the front of the wheelchair 200 via caster legs 228. Other means may be suitable for coupling the casters 224 to the wheelchair 200.

The camber tube assembly 10 may be connected to the drive wheel support brackets 226 by clamps 232. The clamps 232 may be integral with the drive wheel support brackets 226 or the camber tube assembly 10. Alternatively, the camber tube assembly 10 may be coupled to the base frame 210 or the seat assembly 212 if the drive wheel support brackets 226 are omitted. If the drive wheel support brackets 226 are omitted, the camber tube assembly 10 may be integral with the base frame 210 or seat assembly 212.

Figure 2:
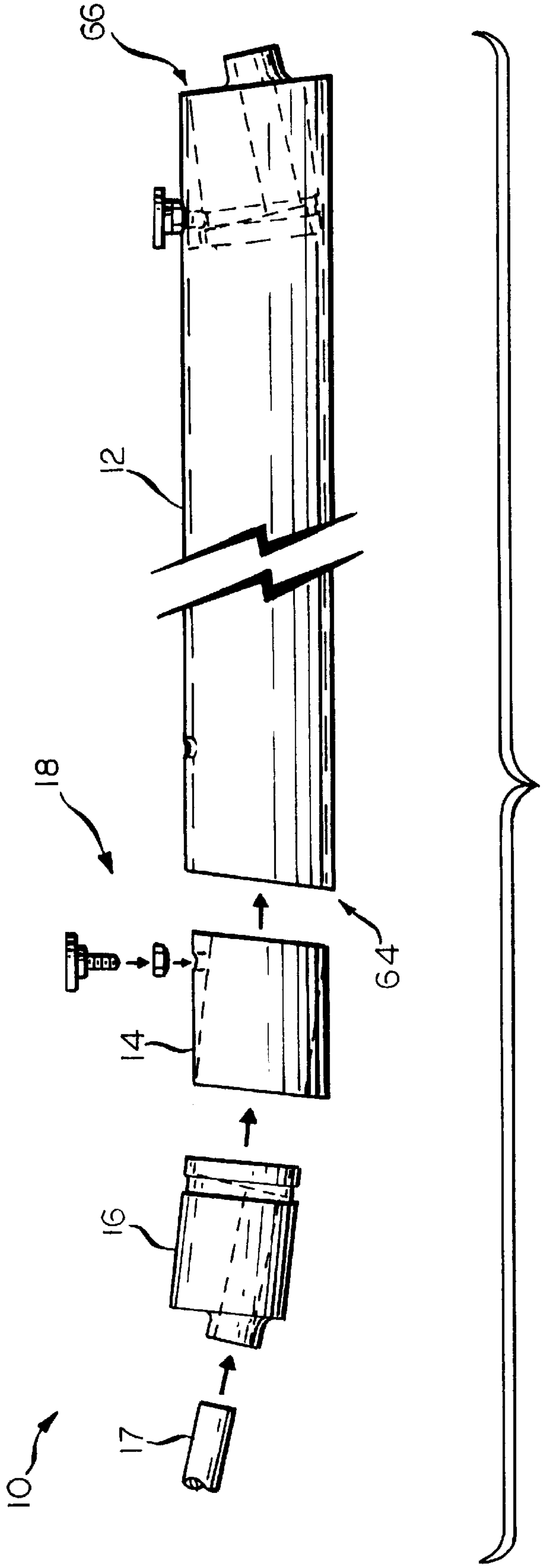
FIG. 2 is a partially exploded view of an adjustable camber tube assembly according to the invention.

As shown in FIG. 2, the camber tube assembly 10 comprises a cross-tube 12, an inner camber sleeve 14, an axle sleeve 16, and a locking mechanism 18. The inner camber sleeve 14 is movably or displaceably engageable with the cross-tube 12. That is to say, the inner camber sleeve 14 shown is slidably engageable with the cross-tube 12. In a manner similar to the mounting of the inner camber sleeve 14 described above, the axle sleeve 16 is movably or displaceably engageable with the inner camber sleeve 14. More particularly, the axle sleeve 16 shown is rotatably engageable with the inner camber sleeve 14. The locking mechanism 18 operatively and releasably engages the cross-tube 12 and the inner camber sleeve 14 to prevent displacement of the cross-tube 12 and inner camber sleeve 14.

Figure 3:
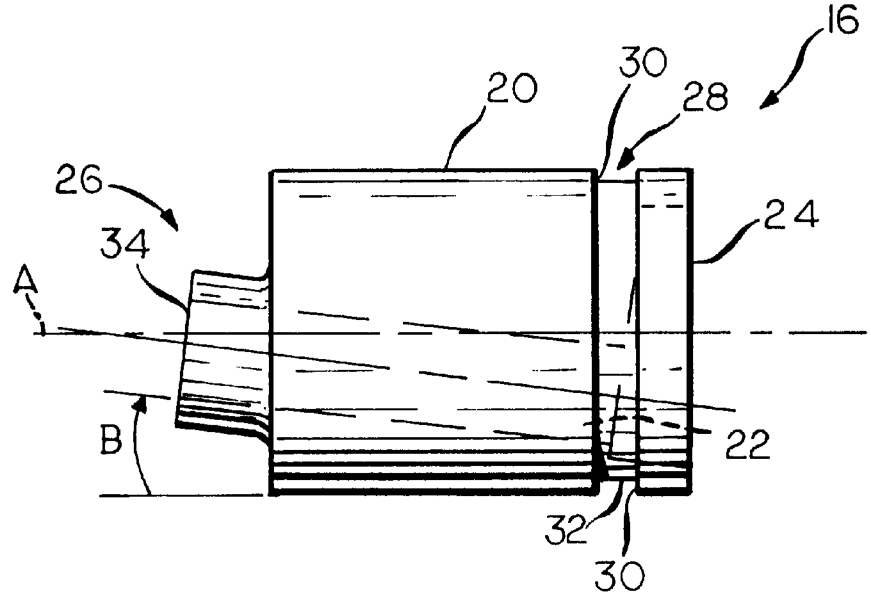
FIG. 3 is an enlarged side elevational view of an axle sleeve of the invention shown in FIG. 2 with an axle bore therein shown in hidden lines.

As shown more clearly in FIG. 3, the axle sleeve 16 is a substantially cylindrical member comprising an outer cylindrical surface 20. An inner cylindrical axle bore 22 is provided in the axle sleeve 16. The axle sleeve 16 has two ends, including a first end or a flat inner surface 24 and a second end or an extended tip or nose 26 opposite the flat inner surface 24. The flat inner surface 24 is disposed substantially perpendicular to a central axis A passing through the axle sleeve 16. The extended tip 26 is disposed at an angle relative to the axis A passing through the axle sleeve 16. An annular groove 28 is located proximate, and substantially parallel to, the flat inner surface 24 of the axle sleeve 16. The annular groove 28 is provided in the outer cylindrical surface 20 of the axle sleeve 16, and is defined by two opposite shoulders 30 and a recessed cylindrical or annular surface 32. The two opposite shoulders 30 are oriented substantially perpendicular to the axis A passing through the axle sleeve 16, and substantially parallel to the flat inner surface 24. The recessed annular surface 32 is substantially coaxial with the axis A and the outer cylindrical surface 20. An opening 34 is provided in the extended tip 26 of the axle sleeve 16. The opening 34 is in communication with the inner cylindrical axle bore 22 in the axle sleeve 16. The inner cylindrical axle bore 22 extends through the extended tip 26. The inner cylindrical axle bore 22 and the axle sleeve 16 are dimensioned and configured to receive the axle (not shown) of a drive wheel 222 (shown in FIG. 1). It should be noted that the inner cylindrical axle bore 22 is disposed at an angle B relative to a horizontal plane which is tangential to the outer cylindrical surface 20 of the axle sleeve 16, or relative to the axis A passing through the axle sleeve 16. That is to say, the inner cylindrical axle bore 22 has a focal point or a central axis disposed at an angle relative to the axis A passing through the axle sleeve 16. The angle may be in the range of about 1.5 degrees to about 6 degrees (splitting typical camber angles that normally lie in the range of 3 to 12 degrees). The angle B shown is about six degrees but other angles may be suitable for carrying out the invention. The extended tip 26 is disposed at an angle which is substantially equivalent to the angle B of the inner cylindrical axle bore 22 but is disposed relative to a vertical plane. That is to say, the extended tip 26 is disposed at an angle substantially perpendicular to a central axis through the inner cylindrical axle bore 22.

Figure 4:
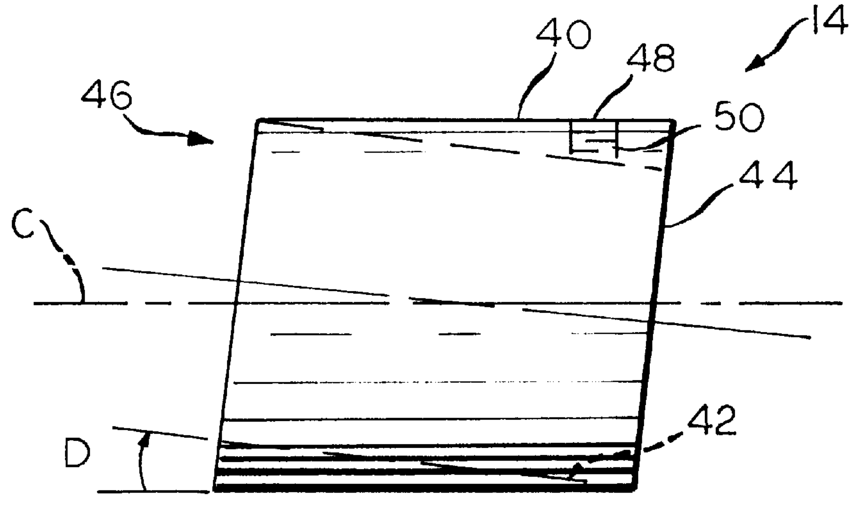
FIG. 4 is an enlarged side elevational view of an inner camber sleeve of the invention shown in FIG. 2 with an inner cylindrical axle sleeve bore therein shown in hidden lines.

As shown more clearly in FIG. 4, the inner camber sleeve 14 is a substantially cylindrical member comprising an outer cylindrical surface 40. An inner cylindrical axle sleeve bore 42 (also referred to as an inner cylindrical bore) is provided in the inner camber sleeve 14. The inner camber sleeve 14 has two ends, including a first end or a flat inner face 44 and a second end or an open outer end 46 opposite the flat inner face 44. The flat inner face 44 is disposed substantially perpendicular to a central axis C passing through the inner camber sleeve 14. The open outer end 46 is disposed at an angle relative to the axis C passing through the inner camber sleeve 14. A radially extending or transverse bore 48 is provided in the outer cylindrical surface 40 of the inner camber sleeve 14 proximate and substantially parallel to the flat inner face 44 of the inner camber sleeve 14. The transverse bore 48 may be threaded with an internal or female thread 50 for a reason that will become more apparent in the description that follows. An opening 52 is provided in the open outer end 46 of the inner camber sleeve 14, and is in communication with the inner cylindrical axle sleeve bore 42 in the inner camber sleeve 14. The inner cylindrical axle sleeve bore 42 and the inner camber sleeve 14 are dimensioned and configured to receive the axle sleeve 16. It should be noted that the inner cylindrical axle sleeve bore 42 is disposed at an angle D relative to a horizontal plane which is tangential to the outer cylindrical surface 40 of the inner camber sleeve 14. That is to say, the inner cylindrical axle sleeve bore 42 is disposed at an angle relative to the axis C passing through the inner camber sleeve 14. That is to say, the inner cylindrical axle sleeve bore 42 has a focal point or a central axis disposed at an angle relative to the axis C passing through the inner camber sleeve 14. The angle may be in the range of about 1.5 degrees to about 6 degrees. It is preferable that the angle D be equivalent and offsetting to the angle B for reasons which will become more apparent hereinbelow. Although the angle D shown is six degrees, other angles may be suitable for carrying out the invention. The open outer end 46 is disposed at an angle which is substantially equivalent to the angle D of the inner cylindrical axle sleeve bore 42 but is disposed at an angle relative to a vertical plane. That is to say, the open outer end 46 is disposed at an angle substantially perpendicular to a central axis through the inner cylindrical axle sleeve bore 42.

An end portion of the cross-tube 12 is illustrated in FIG. 5. The cross-tube 12 is a substantially cylindrical member comprising an outer cylindrical surface 60 and an inner cylindrical surface 62. The cross-tube 12 has two ends, including a first end or open face 64 and a second end or open face (generally indicated at 66 in FIGS. 2 and 10 through 12) opposite the open face 64. The open face 64 is disposed at an angle substantially equivalent to the angle B formed by the angular disposition of the extended tip 26 of the axle sleeve 12, and is also substantially equivalent to the open outer end 46 of the inner camber sleeve 14. The open face 66 is similarly disposed.

An elongated closed slot 68 is provided in the cross-tube 12 proximate the open face 64 and the open face 66 of the cross-tube 12 (although the elongated closed slot 68 in the open face 66 is not shown). The purpose of the slot 68 is to enable the locking mechanism 18 (shown in FIG. 6) to lock the inner camber sleeve 14 and the axle sleeve 16 in place once the sleeves 14, 16 are properly positioned. The elongated closed slot 68 extends laterally or parallel to the axis E passing through the cross-tube 12 and originates from a point that is a predetermined distance 69 (shown in FIG. 5) from the open face 64 and the open face 66 of the cross-tube 12. For example, a distance suitable for carrying out the invention is one-quarter inch. The elongated closed slot 68 preferably has a lateral dimension that is about 1.5 inches. Other dimensions may be suitable for carrying out the invention. The elongated closed slot 68 further preferably has a dimension sufficiently small enough to prevent passage of any portion of the tightening knob 80 therein. The tightening knob 80 will be set forth hereinbelow.

A locking mechanism 18 is illustrated in FIG. 6. The locking mechanism 18 is operatively engageable with the axle sleeve 18. The locking mechanism 18 includes a tightening knob 80 and a stud 82 extending from the tightening knob 80. The stud 82 is provided with an external or male thread 84. The male thread 84 is matingly engageable with the female thread 50 in the transverse bore 48 in the inner camber sleeve 14. Alternatively, a nut 94, or some other internally threaded or female threaded member, may be slidably engageable with the elongated closed slot 68 in the cross-tube 12 and the stud 82 may be engageable with the nut 94. The tightening knob 80 has a first or raised engagement or contact surface 86 defined in part by a peripheral or cylindrical surface 88 that is arranged coaxially with the stud 82. The diameter of the raised contact surface preferably exceeds the dimension of the elongated closed slot 68 in the cross-tube 12 so as to not fit within the elongated closed slot 68. It is also preferable that the depth G of the peripheral surface 88 be sufficient to space the tightening knob 80 apart from the outer cylindrical surface 60 of the cross-tube 12. In this way, the tightening knob 80 may be easily grasped and turned by the user or the wheelchair occupant. The tightening knob 80 may be provided with a serrated periphery 92 to enhance the grip of the person turning the tightening knob 80.

Figure 10:
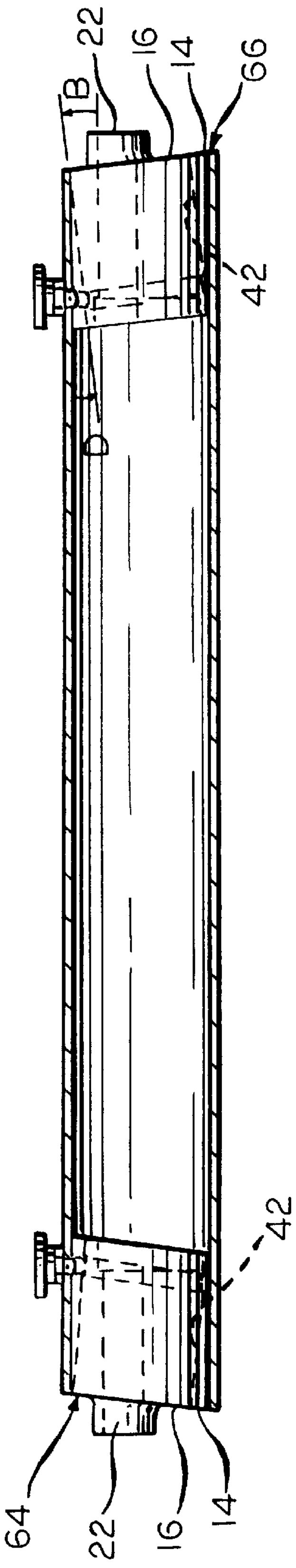
FIG. 10 is a side elevational view of the adjustable camber tube assembly with the inner camber sleeves adjusted to an uncambered position.
Figure 11:
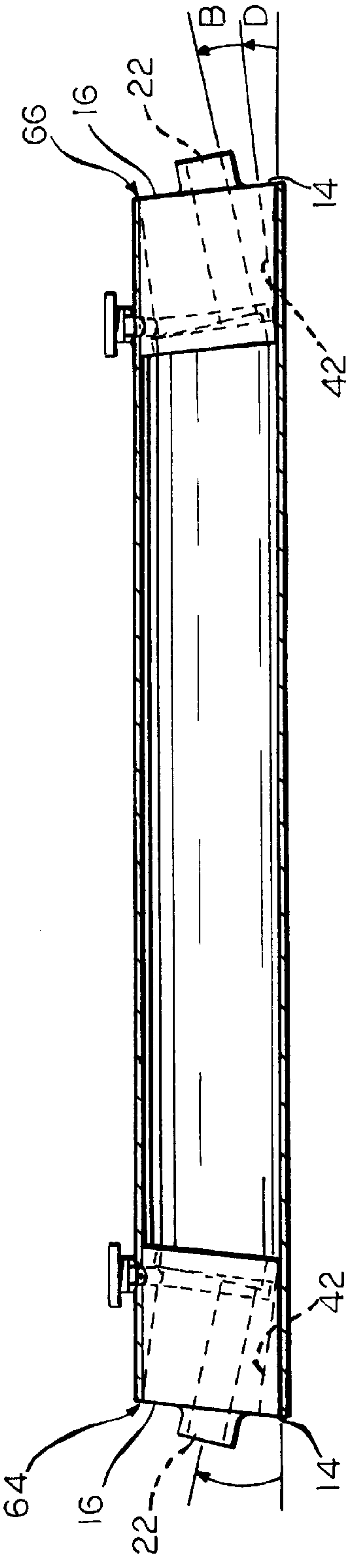
FIG. 11 is a side elevational view of the adjustable camber tube assembly with the inner camber sleeves adjusted to a cambered position.
Figure 12:
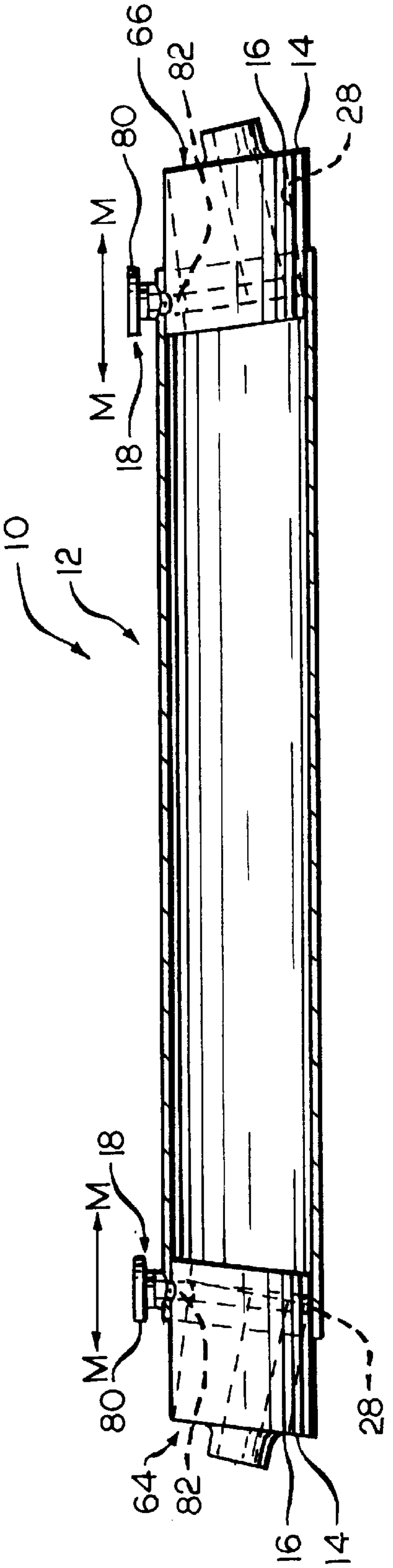
FIG. 12 is a side elevational view of the adjustable camber tube assembly with the width of the cross-tube increased as a result of the lateral displacement of the inner camber sleeves.

The operation of the adjustable camber tube assembly 10 according to the first embodiment is best understood with reference to FIGS. 10 through 12. FIG. 10 illustrates the axle sleeve 16 adjusted to an uncambered position. A zero camber angle is the resultant angle of the sum of the angle B of the inner cylindrical axle bore 22 in the axle sleeve 16 and the angle D of the inner cylindrical axle sleeve bore 42 in the inner camber sleeve 14. The angle B of the inner cylindrical axle bore 22 and the angle D of the inner cylindrical axle sleeve bore 42 are equivalent offsetting angles that cancel one another out, or the sum of which is zero, when the axle sleeve 16 is adjusted to the uncambered position, and the sum of which is greater than zero when the axle sleeve is adjusted to a cambered position. In an uncambered position, the drive wheel axles 17 (shown in FIG. 2) are substantially horizontal and the drive wheels 222 (shown in FIG. 1) are substantially vertical. FIG. 11 illustrates the axle sleeve 16 is adjusted to a cambered position. The resultant angle of the sum of the angle B of the inner cylindrical axle bore 22 and the angle D of the inner cylindrical axle sleeve bore 42 when the axle sleeve 16 is adjusted to this position is greater than zero. As a result, the drive wheels 222 (shown in FIG. 1) are cambered. If the angle B of the inner cylindrical axle bore 22, for example, were six degrees and the angle D of the inner cylindrical axle sleeve bore 42 were likewise six degrees, the resultant angle of the inner cylindrical axle bore 22 would be zero if the sleeves 14 and 16 where adjusted to an uncambered position. If the sleeves 14 and 16 where adjusted to a cambered position, the resultant angle of the inner cylindrical axle bore 22 would be twelve degrees. It should be understood that various inner camber sleeves 14 and various axle sleeves 16 can be used cooperatively and interchangeably to produce various camber angles.

With reference to FIG. 12, the sleeves 14 and 16, and the locking mechanism 18 are laterally or axially displaceable in the directions of the arrows M—M by loosening the tightening knob 80 to disengage the tightening knob 80. The adjustable camber tube assembly 10 in FIGS. 10 and 11 is shown adjusted to a minimum width position. The adjustable camber tube assembly 10 in FIG. 12 is shown adjusted to a maximum width position. The adjustable camber tube assembly 10 in FIGS. 10, 11 and 12 is adjusted to a fixed width by locking the locking mechanism 18, that is, by tightening the tightening knob 80 to engage the stud 82 with the annular groove 28 in the axle sleeve 16.

In summary, the locking mechanism 18 is engageable with the outer cylindrical surface 20, or the annular groove 28, of the axle sleeve 16 to releasably lock the axle sleeve 16 in a fixed position. When assembled, at least a portion of the annular groove 28 in the outer cylindrical surface 20 of the axle sleeve 16 radially coaligns with the transverse bore 48. The transverse bore 48 in the inner camber sleeve 14 also radially coaligns with at least a portion of the elongated closed slot 68 in the cross-tube 12. At least a portion of the locking mechanism 18, namely, the stud 82, passes through the elongated closed slot 68 and the transverse bore 48 to engage the annular groove 28 to releasably lock the sleeves 16, 18 in a fixed position relative to the cross-tube 12.

Figure 8:
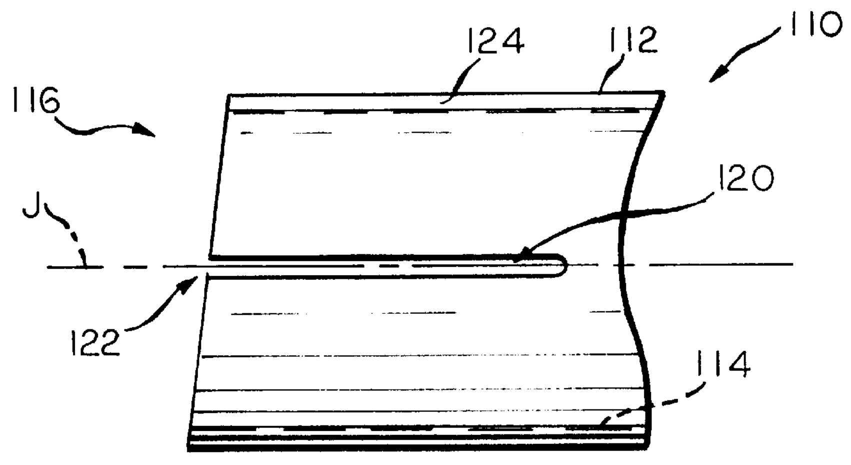
FIG. 8 is an enlarged side elevational view of an alternative cross-tube of the adjustable camber tube assembly shown in FIG. 7 with an inner cylindrical surface thereof shown in hidden lines.
Figure 9:
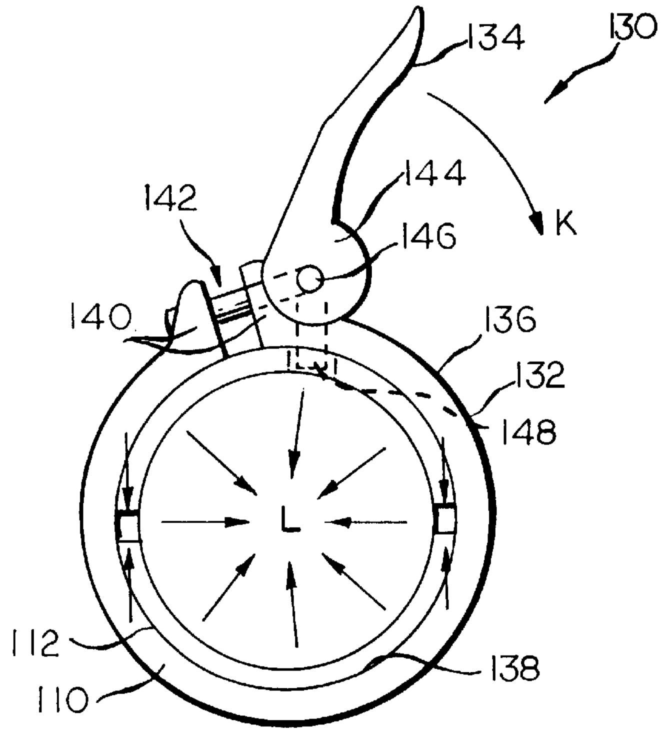
FIG. 9 is a diagrammatic representation of the alternative locking mechanism and the alternative cross-tube shown in FIG. 7, and further showing radial forces acting upon the cross-tube to radially compress the cross-tube.

An alternative cross-tube 110 and alternative locking mechanism 130 are shown in FIGS. 7 through 9. The alternative cross-tube 110 shown in FIGS. 7 and 8 is a substantially cylindrical member comprising an outer cylindrical surface 112 and an inner cylindrical surface 114. The alternative cross-tube 110 also has two ends, including a first end or open face 116 and a second end or open face (not shown) opposite the first open face 116. The open face 116 is disposed at an angle relative to a vertical plane or relative to a plane perpendicular to an axis J passing through the alternative cross-tube 110. Similarly, the second open face is disposed at an angle relative to a vertical plane or relative to a plane perpendicular to the axis J passing through the alternative cross-tube 110. Two elongated open slots 120 are provided in the alternative cross-tube 110 proximate the first open face 116 and the second open face of the alternative cross-tube 110. The two elongated open slots 120 are spaced 180 degrees apart and extend laterally, or parallel to the axis J passing through the alternative cross-tube 110, and originate at the first open face 116 and the second open face (not shown) of the alternative cross-tube 110. The two elongated open slots 120 each preferably have a lateral dimension in the range of about 1.5 to about 1.75 inches and a dimension in the order of about one-eighth of an inch. Other dimensions may be suitable for carrying out the invention. It should be noted that the two elongated open slots 120 each have an open end 122 in communication with the first open face 116 and the second open face (not shown) of the alternative cross-tube 110. The two elongated open slots 120 and the open end 122 of each elongated open slot 120 at the first end 116 and at the second end (not shown) of the alternative cross-tube 110 permit the cross-section at the first end 116 and at the second end of the alternative cross-tube 110 to compress, or reduce in dimension, upon applying radial forces to the first end 116 and second end of the alternative cross-tube 110. This will be more clearly understood upon reading the description hereinbelow. It should be understood that a greater number of slots 120 may be provided.

As shown in FIGS. 7 and 9, the alternative locking mechanism 130 includes a split ring or band 132 and a lever arm 134 coupled to the split ring 132. The split ring 132 has an outer cylindrical surface 136 and an inner cylindrical surface 138. The split ring 132 is slidably engageable with the alternative cross-tube 110. The inner cylindrical surface 138 of the split ring 132 is dimensioned within a close tolerance of the outer cylindrical surface 112 of the alternative cross-tube 110 so as to produce a snug fit between the split ring 132 and the alternative cross-tube 110. A pair of spaced apart tabs 140 is integral with, and extends radially outward from, the split ring 132. A gap 142 is provided in the split ring 132 and between the spaced apart tabs 140 so as to provide a break in the split ring 132. The lever arm 134 has an enlarged member 144 that is movably or displaceably attached to the split ring 132 by a pin at a fulcrum point 146. The enlarged member 144 is movably or displaceably engageable with one of the spaced apart tabs 140. Upon displacing the lever arm 134 in the direction of the arrow K, the gap 142 closes, or at least partially closes, to compress the split ring 132 or reduce the internal dimensions of the split ring 132 defined by the inner cylindrical surface 138. This produces radially inward forces, generally indicated as L. These radial forces L are exerted upon the outer cylindrical surface 112 of the alternative cross-tube 110. Upon displacing the lever arm 134 in the direction of the arrow K, the gap 142 narrows and the inner cylindrical surface 114 of the split ring 132 merges towards the outer cylindrical surface 20 of the inner camber sleeve 152 (shown in FIG. 7) to hold the inner camber sleeve 152 firmly in place within the alternative cross-tube 110. The split ring 132 may be released by displacing the lever arm 134 in a direction opposite to the direction of the arrow K. This frees the inner camber sleeve 152 and the axle sleeve 154 within the alternative cross-tube 110 to permit inner camber sleeve 152 and the axle sleeve 154 to move laterally or axially within the alternative cross-tube 110. This lateral or axial adjustment results in a change in width of the alternative cross-tube 110. It should be noted that the alternative cross-tube 110 includes a camber sleeve engaging pin 148 that functions in a capacity similar to that of the stud 82 described above. That is to say, the camber sleeve engaging pin 148 is selectively engageable and disengageable with two holes 150 in the axle sleeve 154 spaced 180 degrees apart to set the drive wheels 222 in one of two pre-selected positions, namely, a cambered position (shown in FIG. 7) and an uncambered position (not shown).

The operation of the alternative cross-tube 110 and alternative locking mechanism 130 is functionally the same as that set forth above. The operation of alternative cross-tube 110 and alternative locking mechanism 130, however, is distinguished from cross-tube 12 and locking mechanism 18 in at least two aspects. In one aspect, the axle sleeve 154 is provided with two radially extending holes 150 spaced 180 degrees apart. A radially displaceable camber sleeve engaging pin 148 is selectively and releasably engageable with the two radially extending holes 150 to selectively and releasably lock the axle sleeve 154 in two positions. In a first position, the axle sleeve 16 is adjusted to an uncambered position because the sum of the angle B of the inner cylindrical axle bore 22 and the angle D of the inner cylindrical axle sleeve bore 42 is zero. In a second position, the sum of the angle B of the inner cylindrical axle bore 22 and the angle D is greater than zero. As a result, axle sleeve 154 is adjusted to a cambered position, as is illustrated in FIG. 7.

In another aspect, the locking mechanism 130 includes a radially expansible and compressible split ring 132 as illustrated in FIG. 9. The sleeves 152 and 154 are displaceable relative to the alternative cross-tube 110 by displacing the lever arm 134 in a direction opposite to the direction of the arrow K to expand the split ring 132 radially outward. Once the sleeves 152 and 154 are in a desired position, the lever arm 134 may be displaced in the direction of the arrow K to cause the split ring 132 to compress tightly against the alternative cross-tube 110 to tightly and releasably engage the sleeves 152 and 154 and thereby prevent movement of the sleeves 152 and 154.

Although not shown, it should be understood that two separate tubes may be supported independently of one another by each side of the wheelchair base frame 210 instead of providing a single cross-tube 12 that spans the drive wheel support brackets 226. It should be further understood that each independently supported tube would support an inner camber sleeve 14, an axle sleeve 16, and a locking mechanism for releasably locking the inner camber sleeve 14 and the axle sleeve 16 in a fixed position relative to their respective tube.

Cross-tubes 10, 110 having a diameter in the order of about two inches and sleeves 14, 16 having a length in the order of about four inches are suitable for carrying out the invention. The location of the axle bore 22 (relative to the axis A through the axle sleeve 16, for example) may be dependent on the desired camber angle. The position of the axle bore 22 may be adjusted vertically dependent upon the angular displacement of the axle bore 22. Other factors affecting the dimensions set forth above include occupant preferences and the physical characteristics of the wheelchair 200. It should be understood that dimensions set forth above are merely for illustrative purposes and that other dimensions may be suitable for carrying out the invention.

The invention enables the camber angle of the drive wheels of a wheelchair to be adjusted with greater ease and expediency. Thus, a single wheelchair may be quickly and easily configured for normal and recreational activities. This eliminates the need for having different wheelchairs for different activities. The invention is especially useful in enabling a wheelchair 200 with cambered drive wheels 222 to be converted so as to be maneuverable in places providing limited space, for example, in a hallway. The invention enables the camber angle of the drive wheels 222 and to be adjusted independently of the width of the cross-tubes 10, 110.

Figure 13:
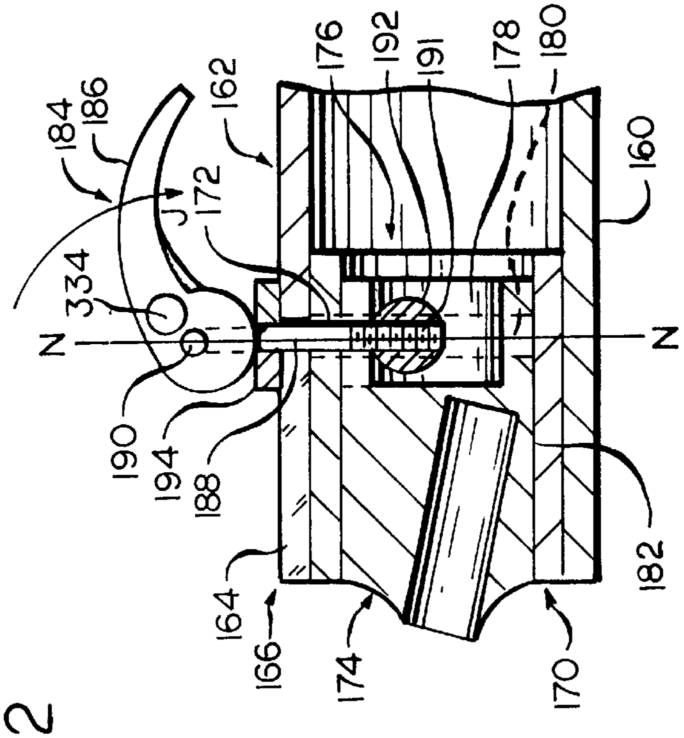
FIG. 13 is a cross-sectional view in elevation of an alternative embodiment, showing and alternative locking mechanism.
Figure 14:
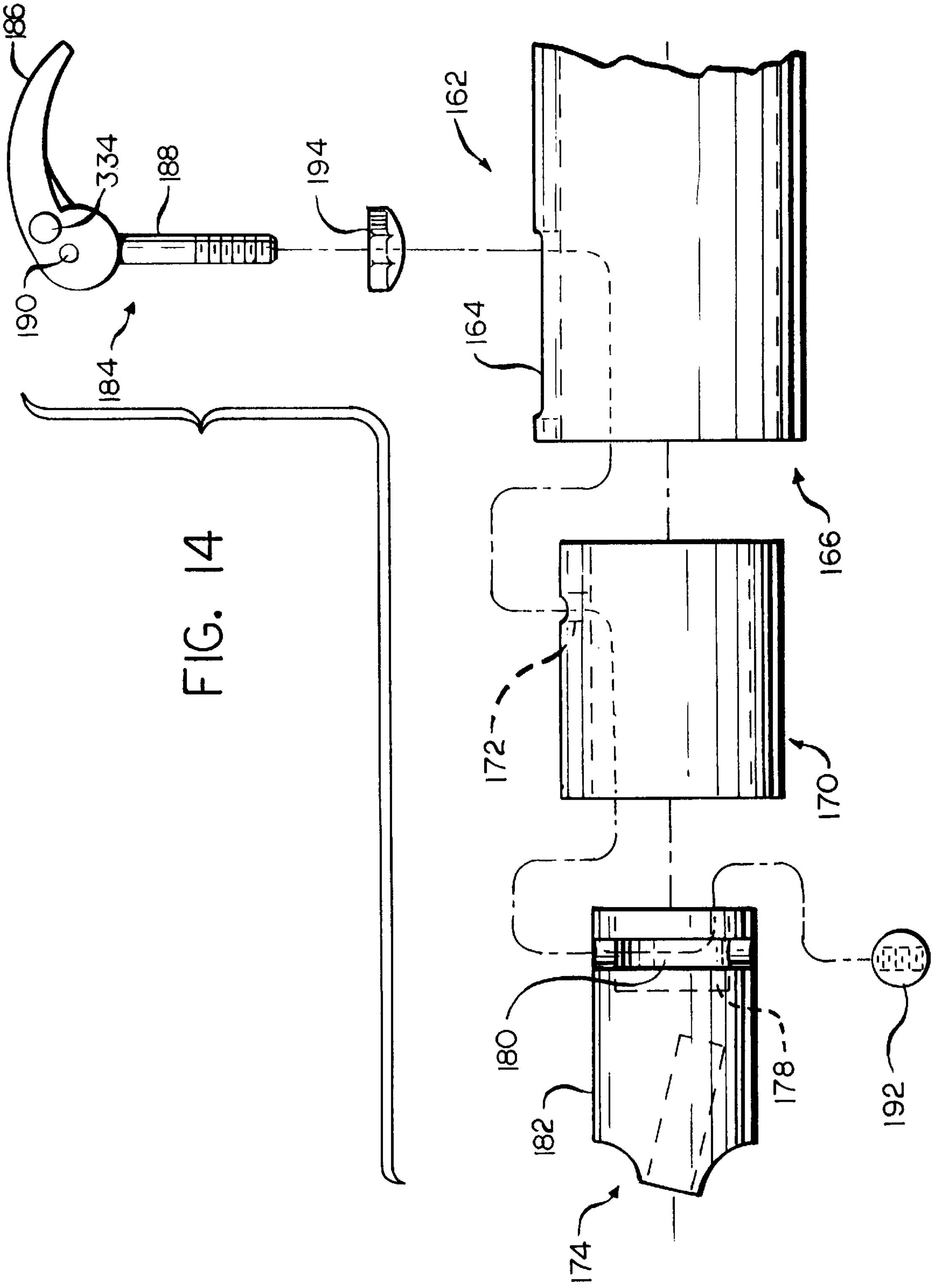
FIG. 14 is an exploded elevational view of the embodiment shown in FIG. 13.

Another embodiment of the invention, as shown in FIGS. 13 and 14, includes an elongated slot 164 at each end 166 (the opposing end 168 not shown) of the cross-tube 162. Each slot 164 extends laterally and may be a closed slot that terminates a predetermined distance from the ends 166 and 168 of the cross-tube 162 or an open slot that communicates with the ends 166 and 168 of the cross-tube 162.

A non-threaded transverse bore 172 is preferably provided in the inner camber sleeve 170. The transverse bore 172 is dimensioned and configured to permit the passage of a portion of a locking mechanism 184 therethrough. The locking mechanism 184 will be described in greater detail in the description that follows.

The first end 176 of the axle sleeve 174 preferably has a hollow region 178. A semi-annular slot 180 is provided in the axle sleeve 174 proximate the first end 176 of the axle sleeve 174. The semi-annular slot 180 communicates with the hollow region 178. The area of the hollow region 178 is preferably dimensioned and configured to receive and contain a fastening element, such as a spherical nut 192. The spherical nut 192 is a component of the locking mechanism, as will become more apparent in the description that follows.

The locking mechanism 184 according to this embodiment includes a displaceable lever arm 186 that is pivotally coupled to a partially threaded locking pin 188 at a pivot or fulcrum 190. An end of the locking pin 188 opposite the fulcrum 190 is provided with a male or externally threaded portion 191. The spherical nut 192 is threadably engageable with the externally threaded portion 191 of the locking pin 188. The externally threaded portion 191 of the locking pin 188 is insertable into and through the slot 164 in the cross-tube 162, the transverse bore 172 in the inner camber sleeve 170, and the semi-annular slot 180 in the axle sleeve 174. The locking pin 188 is oriented in such a manner that the lever arm 186 is exposed, or disposed outside the cross-tube 162, and the externally threaded portion is concealed or disposed within the hollow region 178 of the axle sleeve 174. In this way, a non-threaded portion of the locking pin 188 occupies the slot 164 in the cross-tube 162, the transverse bore 172 in the inner camber sleeve 170, and the semi-annular slot 180 in the axle sleeve 174. The locking pin 188 is provided to facilitate in coupling together the cross-tube 162, the inner camber sleeve 170, and the axle sleeve 174, as will become more apparent in the description that follows.

As shown in FIG. 13, the spherical nut 192 threadably engages the externally threaded portion 191 of the locking pin 188. The spherical nut 192 is preferably provided with a nylon locking insert which resists movement of the spherical nut 192 relative to the locking pin 188 to prevent the spherical nut 192 from becoming inadvertently disengaged from the locking pin 188. It is preferable that a saddle washer 194 be provided between the lever arm 186 and the outer cylindrical surface 160 of the cross-tube 162. The lever arm 186 is pivotally displaceable on the fulcrum 190 and cams against the saddle washer 194 to displace the locking pin 188 along the line N—N. As the lever arm 186 is displaced in the direction of the arrow J, the cross-tube 162, the inner camber sleeve 170, and the axle sleeve 174 are clamped between the saddle washer 194 and the spherical nut 192. To release the locking mechanism 184, the lever arm 186 is displaced in the direction opposite to the direction of the arrow J.

The camber angle of the drive wheels 222 (shown in FIG. 1) is adjustable by loosening the lever arm 186 sufficiently to permit the axle sleeve 174 to rotate relative to the inner camber sleeve 170. The cross-tube 162 and the inner camber sleeve 170 remain substantially fixed. However, the axle sleeve 174 is permitted to rotate with the non-threaded portion of the locking pin 188 passing substantially 180° through the semi-annular slot 180. With the locking pin 188 at one end of the semi-annular slot 180, as shown in FIG. 13, the camber angle is some angle greater than zero. With the locking pin 188 at the other end of the semi-annular slot 180 (not shown), the camber angle is substantially zero.

Figure 15:
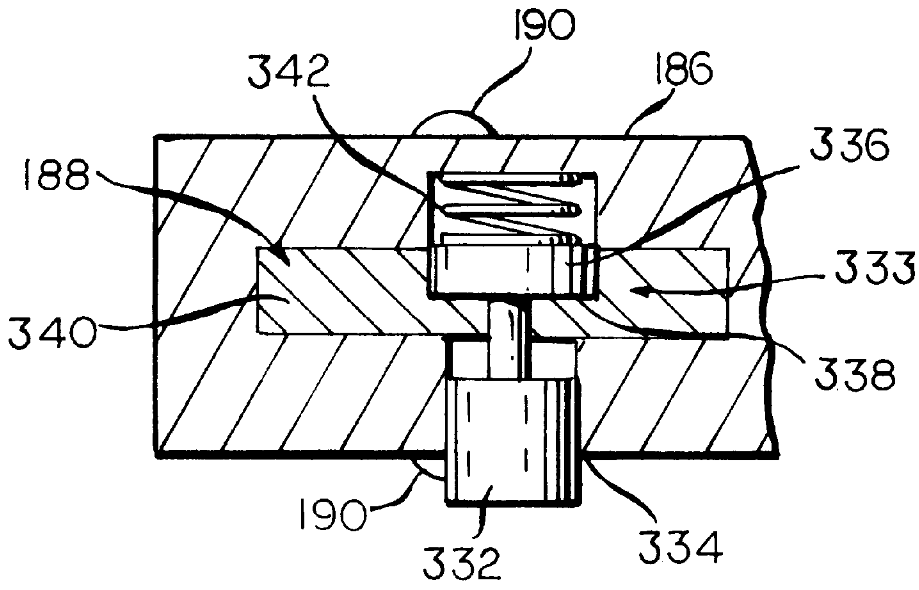
FIG. 15 is a partial cross-sectional view of the locking mechanism shown in FIGS. 13 and 14, further showing a locking configuration for retaining the lever arm of the locking mechanism in a locked position.
Figure 16:
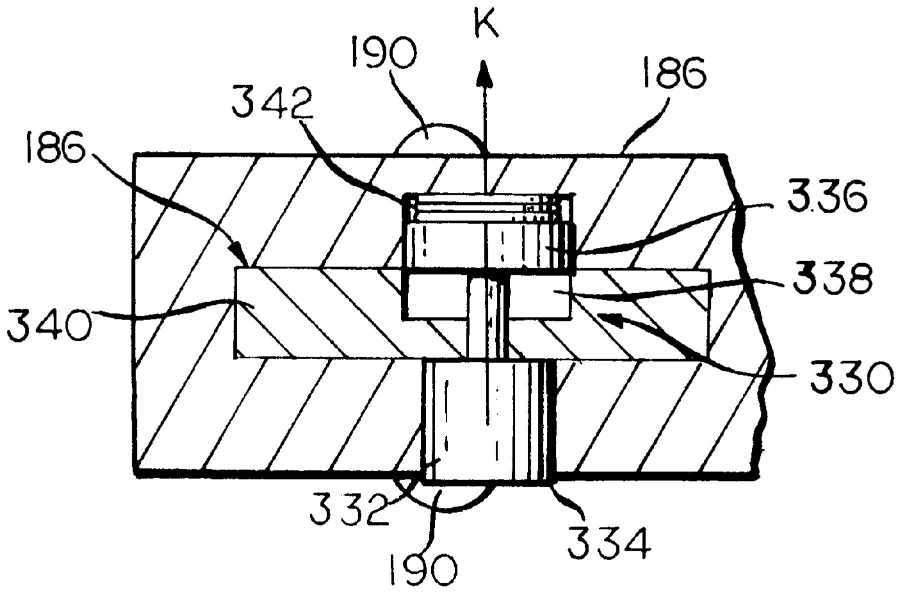
FIG. 16 is a partial cross-sectional view of the locking mechanism shown in FIG. 15 with locking configuration disengaged from the lever arm so as to release the lever arm from the locked position.

To hold this locking mechanism 184 in a locked position, a locking configuration 330 may be provided for retaining the lever arm 186 in a locked position. For example, as shown in FIGS. 15 and 16, an axially displaceable push button 332 may be slidably engageable with a hole 334 in the lever arm 186. The push button 332 may be provided with an interference member 336 that is engageable with a notch 338 provided in the head 340 of the locking pin 188, as shown in FIG. 15. The push button 332 is normally baised into the notch 338 by a biasing element, such as the spring 342 shown. The force of the spring 342 may be overcome by pushing against the push button 332 in the direction of the arrow K to disengage the interference member 336 from the notch 338, as shown in FIG. 16. Upon disengaging the interference member 336 from the notch 338, the lever arm 186 may be moved in a direction opposite to the direction of the arrow J shown in FIG. 13 to unlock the locking mechanism 184.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A camber tube assembly, comprising:

a tube;

an inner camber sleeve slidably engageable within said tube, said inner camber sleeve having a central axis and a cylindrical bore in said inner camber sleeve, said cylindrical bore having a central axis disposed at an angle relative to said inner camber sleeve central axis;

an axle sleeve rotatably engageable within said cylindrical bore in said inner camber sleeve, said axle sleeve having a central axis and an axle bore in said axle sleeve, said axle bore having a central axis disposed at an angle relative to said axle sleeve central axis; and a locking mechanism operatively engageable with said axle sleeve.

2. A camber tube assembly according to claim 1, wherein said angle of said cylindrical bore central axis relative to said inner camber sleeve central axis and said angle of said axle bore central axis relative to said axle sleeve central axis are equivalent and offsetting.

3. A camber tube assembly according to claim 1, wherein said tube has an inner cylindrical surface; and said inner camber sleeve has an outer cylindrical surface, said inner cylindrical surface of said tube being dimensioned within a close tolerance of said outer cylindrical surface of said inner camber sleeve.

4. A camber tube assembly according to claim 1, wherein said axle sleeve has an outer cylindrical surface, said outer cylindrical surface of said axle sleeve being dimensioned within a close tolerance of said cylindrical bore in s aid inner camber sleeve.

5. A camber tube assembly according to claim 1, wherein said axle sleeve comprises an outer surface; and said locking mechanism comprises a threaded stud engageable with said outer surface of said axle sleeve to lock said axle sleeve in a fixed position.

6. A camber tube assembly according to claim 1, wherein said tube has a central axis and a lateral slot extending substantially parallel relative to said central axis of said tube;

said inner camber sleeve has a transverse bore, which is coalignable with at least a portion of said slot;

said axle sleeve comprises a groove at least a portion of which is coalignable with said transverse bore; and said locking mechanism has at least a portion capable of passing through said slot and said transverse bore so as to be engageable with said groove to releasably lock said inner camber sleeve and said axle sleeve in a fixed position relative to each other and relative to said tube.

7. A camber tube assembly according to claim 6, wherein said axle sleeve has an outer cylindrical surface; and said groove is annular and is disposed in said outer cylindrical surface of said axle sleeve.

8. A camber tube assembly according to claim 6, wherein said locking mechanism comprises a threaded stud engageable with said groove in said axle sleeve to releasably lock said axle sleeve in a fixed position.

9. A camber tube assembly according to claim 1, wherein said tube has an outer surface; and said locking mechanism comprises:

a band engageable with the outer surface of said tube to displace said tube radially inward to engage said inner camber sleeve to releasably lock said inner sleeve in a fixed position relative to said tube; and a pin radially displaceable to selectively engage and disengage said axle sleeve to releasably lock said axle sleeve in a fixed position relative to said inner camber sleeve and said tube.

10. A camber tube assembly according to claim 1, wherein said tube has a plurality of spaced apart, elongated open slots therein.

11. A camber tube assembly according to claim 1, wherein said tube has a central axis and a lateral slot extending substantially parallel relative to said central axis of said tube;

said inner camber sleeve has a transverse bore, which is coalignable with at least a portion of said slot;

said axle sleeve comprises a hollow region and an annular slot in communication with said hollow region, at least a portion of said annular slot being coalignable with said transverse bore and said lateral slot; and said locking mechanism has at least a portion capable of passing through said lateral slot, said transverse bore, and said annular slot into said hollow region and engaging a fastening element within said hollow region to releasably lock said inner camber sleeve and said axle sleeve in a fixed position relative to each other and relative to said tube.

12. A camber tube assembly, comprising:

a cross-tube having opposite ends;

two inner camber sleeves, each one of said inner camber sleeves being slidably engageable with one of said ends of said cross-tube, each one of said inner camber sleeves having a central axis and a cylindrical bore having a central axis disposed at an angle relative to said inner camber sleeve central axis;

two axle sleeves, each one of said axle sleeves being rotatably engageable with said cylindrical bore in one of said inner camber sleeves, each one of said axle sleeves having a central axis and an axle bore having a central axis disposed at an angle relative to said axle sleeve central axis; and two locking mechanisms, each one of said locking mechanisms being operatively engageable with one of said axle sleeves.

13. A camber tube assembly according to claim 12, wherein said angles of said cylindrical bore central axes relative to said inner camber sleeve central axes and said angles of said axle bore central axes relative to said axle sleeve central axes are equivalent and offsetting.

14. A camber tube assembly according to claim 12, wherein said tube has an inner cylindrical surface; and each one of said inner camber sleeves has an outer cylindrical surface, said inner cylindrical surface of said tube being dimensioned within a close tolerance of said outer cylindrical surface of said inner camber sleeves.

15. A camber tube assembly according to claim 14, wherein each one of said axle sleeves has an outer cylindrical surface, said outer cylindrical surface of said axle sleeves being dimensioned within a close tolerance of said cylindrical bores.

16. A camber tube assembly according to claim 12, wherein each one of said axle sleeves comprises an outer surface; and each one of said locking mechanisms comprises a threaded stud engageable with said outer surface of said axle sleeves to releasably lock said axle sleeves in a fixed position.

17. A camber tube assembly according to claim 12, wherein each one of said ends of said tube has a central axis and a lateral slot extending substantially parallel relative to said central axis of said tube;

each one of said inner camber sleeves has a transverse bore which is coalignable with at least a portion of a respective one of said slots;

each one of said axle sleeves comprises a groove at least a portion of which is coalignable with a respective one of said transverse bores; and each one of said locking mechanisms has at least a portion capable of passing through a respective one of said slots and a respective one of said transverse bores so as to be engageable with a respective one of said grooves to releasably lock each one of said inner camber sleeves and said axle sleeves in a fixed position relative to each other and relative to a respective one of said ends of said tube.

18. A camber tube assembly according to claim 17, wherein each one of said ends of said tube has an outer surface; and each one of said locking mechanisms comprises:

a band engageable with said outer surface of each one of said ends of said tube to displace said ends of said tube radially inward to engage a respective one of said inner camber sleeves to releasably lock said inner sleeves in a fixed position relative to said ends of said tube; and a pin radially displaceable to selectively engage and disengage a respective one of said axle sleeves to releasably lock each one of said axle sleeves in a fixed position relative to a respective one of said inner camber sleeves and a respective one of said ends of said tube.

19. A wheelchair, comprising:

a wheelchair frame having opposite sides; and a camber tube assembly, comprising:

a tube having opposite ends, each one of said ends of said tube being attachable to one of said sides of said wheelchair frame;

two inner camber sleeves, each one of said inner camber sleeves being slidably engageable with one of said ends of said cross-tube, each one of said inner camber sleeves having a central axis and a cylindrical bore having a central axis disposed at an angle relative to said inner camber sleeve central axis;

two axle sleeves, each one of said axle sleeves being rotatably engageable with said cylindrical bore in one of said inner camber sleeves, each one of said axle sleeves having a central axis and an axle bore having a central axis disposed at an angle relative to said axle sleeve central axis; and two locking mechanisms, each one of said locking mechanisms being operatively engageable with one of said axle sleeves.

* * * * *